(12) United States Patent
Borazghi

(10) Patent No.: US 7,879,174 B2
(45) Date of Patent: Feb. 1, 2011

(54) PROCESS FOR PRODUCING LIGHTWEIGHT THERMOPLASTIC COMPOSITE PRODUCTS IN A CONTINUOUS MANNER

(76) Inventor: Hossein Borazghi, 241, rue Laurier, Ile-Bizard, Quebec (CA) H9C 3A5

( * ) Notice: Subject to any disclaimer, the term of this patent is extended or adjusted under 35 U.S.C. 154(b) by 641 days.

(21) Appl. No.: 11/958,512

(22) Filed: Dec. 18, 2007

(65) Prior Publication Data

US 2008/0093766 A1   Apr. 24, 2008

Related U.S. Application Data

(62) Division of application No. 11/006,707, filed on Dec. 8, 2004, now Pat. No. 7,429,305.

(51) Int. Cl.
  *B32B 27/04*   (2006.01)
  *B32B 37/08*   (2006.01)
  *B29C 43/24*   (2006.01)
(52) U.S. Cl. .................... 156/200; 156/279; 156/309.9; 156/311; 156/322; 264/175; 264/257
(58) Field of Classification Search .................. 156/200, 156/242, 279, 309.9, 311, 322, 324; 264/175, 264/257
See application file for complete search history.

(56) References Cited

U.S. PATENT DOCUMENTS 4,414,266 A * 11/1983 Archer et al. ............... 156/242
2001/0032696 A1* 10/2001 Debalme et al. ............ 156/172

* cited by examiner

*Primary Examiner*—Michael A Tolin
(74) *Attorney, Agent, or Firm*—Ogilvy Renault LLP

(57) ABSTRACT

A process for producing lightweight thermoplastic composite products in a continuous manner is disclosed. An oven is provided for heating a dry unconsolidated fabric sheet of commingled fibers of thermoplastic and re-enforcing fibers or carbon fibers to a temperature sufficient to ensure melting and flow of the resin in the voids of the commingled fibers. The unconsolidated composite sheet is conveyed through the oven and then through a first pair of heated rollers at an outlet of the oven whereby to maintain the fabric sheet heated to prevent abrupt cooling at the surfaces while compressing it under pressure. A further pair of rollers at a further reduced temperature is provided whereby the heated sheet is gradually lowered in temperature and the pressure is maintained thereon during consolidation of the commingled fibers to ensure complete flow of the resin in the voids between the reinforcing fibers. The continuous composite consolidated sheet can then be processed to sheet form, or laminated in a sandwich, or profiled whereby to form a desired product.

14 Claims, 2 Drawing Sheets

PROCESS FOR PRODUCING LIGHTWEIGHT THERMOPLASTIC COMPOSITE PRODUCTS IN A CONTINUOUS MANNER

CROSS-REFERENCE TO RELATED APPLICATION

This patent application is a divisional of U.S. patent application Ser. No. 11/006,707, filed on Dec. 8, 2004 now U.S. Pat. No. 7,429,305, by the present applicants and which is hereby incorporated by reference.

TECHNICAL FIELD

The present invention relates to a process for the production of lightweight thermoplastic composite products in a continuous manner.

BACKGROUND ART

The uses available from polymer based composite materials has been considerably broadened by the introduction of thermoplastic (TP) matrices. Thermoplastic polymers, in particular semi-crystalline ones, provide a number of significant advantages over their thermosetting counterparts. They exhibit better fraction toughness, there is no need for chemical reaction during processing and therefore no toxicity during processing and application, and they are recyclable.

On the other hand, the high viscosity of the molten thermoplastic resin imposes many limitations on the manufacturing process with these materials. These are usually related to the need of incorporating the highly viscous polymer into the structure made of continuous reinforcing fibers. Use of commingled yarn is one of the most promising approaches for fast production of TP based composites. Commingling of thermoplastic and reinforcement fibers gives a good initial matrix-reinforcement distribution in a non-molten state before processing. This represents a kind of dry impregnation, which circumvents some of the difficulties associated with the high viscosity of the molten polymer.

Fabric woven from commingled yarn can be processed by application of heat and pressure into composite materials in a manner analogous to that of thermoset based prepregs. The relatively uniform commingling of the reinforcing matrix fibers minimizes the distance the molten thermoplastic is required to flow to fill the inter fiber spaces and this allows the material to be consolidated using reasonable pressure even at high fiber content of glass fibers.

Today, compression molding is the most important manufacturing process used for commingled fabrics. When fabric is heated above the melting point of the resin, the thermoplastic fibers melt and flow around the glass fibers under applied pressure and fill the space between them. The initially separated yarn, now consisting of reinforcing fiber bundles and the molten polymer move towards one another, and the polymer flows out of the bundles to fill the free space between them. As the pressure increases the smaller inter-fiber voids are filled leading to a, hopefully, full consolidation (i.e. void free material). When consolidation is finished, the composite material has to be cooled under pressure, down to a temperature where the resin is solid enough to avoid unwanted deformation after demolding. These are the problems encountered in high volume fabrication of TP composite that necessitates use of automated, well controlled, and expensive fabrication process.

SUMMARY OF INVENTION

It is a feature of the present invention to provide a different process and apparatus to produce lightweight thermoplastic composite products but in a continuous manner by the use of a continuous process whereby to lower manufacturing costs and to eliminate the physical restraints of mold and oven dimensions. A continuous process also facilitates the production of desired products either by roll forming at the outlet of the continuous process or the production of sandwich panels or sheets of large dimensions which can be used in the manufacture of walls, roof sections, doors, flooring of train cars, automobiles, shipping containers, only to name a few products where reduced weight is of importance to obtain the benefit of reduced gas consumption and consequently the release of hazardous gas emissions. By roll forming, products can be produced for use in the construction of highway guardrails, which traditionally have been made of corrugated galvanized steel plates and beams. Such is prone to corrosion in harsh environments and resulting in loss of strength, durability and deterioration of its appearance. Such guardrails also damage vehicles and injure passengers and must be replaced after being impacted by a vehicle. By the use of thermoplastic composite materials, a significant weight reduction with excellent fatigue and impact behaviour, especially at low temperature, can be obtained.

Large sandwich panels can also be used in the construction of concrete forms for the construction of high-rise buildings, large construction projects, the rebuilding and renovation of infrastructures, roads, and bridges. Currently, the forms are made of laminated plywood, aluminum or steel sheets and this poses several problems such as heavy weight, corrosion, short life span and high cost and is also labour intensive to manipulate. Traffic sign panels and outdoor advertising panels are other examples of the application of sandwich panels. These materials may find several applications in the transport industry, such as in truck containers, buses, trains, etc.

Any product application, where weight reduction, impact resistance, corrosion resistance and life-cycle costs are issues of concern, will benefit from the structural materials which are designed and manufactured, using thermoplastic composites, and in accordance with the continuous process of the present invention.

According to a further broad aspect of the present invention there is provided a continuous process for the production of lightweight thermoplastic composite products. The process comprises the steps of feeding on a continuous basis a sheet of dry unconsolidated commingled fibers of thermoplastic resin and reinforcing fiberglass or carbon fibers in an oven to heat the sheet to a temperature sufficient to insure melting and flow of the thermoplastic resin fibers. The sheet is then subjected to further controlled heat and pressure by feeding the sheet from the oven through a gap between a first pair of heated rollers. The rollers are heated to a predetermined temperature and the sheet is compressed in the gap. The sheet is then fed through further pairs of rollers, at least one pair of which is a pair of heated rollers operating at a reduced temperature from the first pair of heated rollers to reduce the temperature of the sheet and further maintain the sheet under pressure to ensure full distribution of the resin and to obtain a desired sheet thickness while causing the commingled fibers to consolidate to thereby form a continuous composite consolidated sheet. The temperature of the oven, of the heated rollers, and the feed speed of the sheet are all controlled by a computer controller. The sheet is then processed progressively to form a desired product by using forming rollers.

BRIEF DESCRIPTION OF DRAWINGS

A preferred embodiment of the present invention will now be described with reference to the accompanying drawings in which:

FIG. 3 is a view similar to FIG. 2, but illustrating a sandwich panel constructed by the machine and process of the present invention and comprised of a center core material sandwiched between opposed composite consolidated sheets fabricated by the machine and process of the present invention.

DESCRIPTION OF PREFERRED EMBODIMENTS

Figure 1:
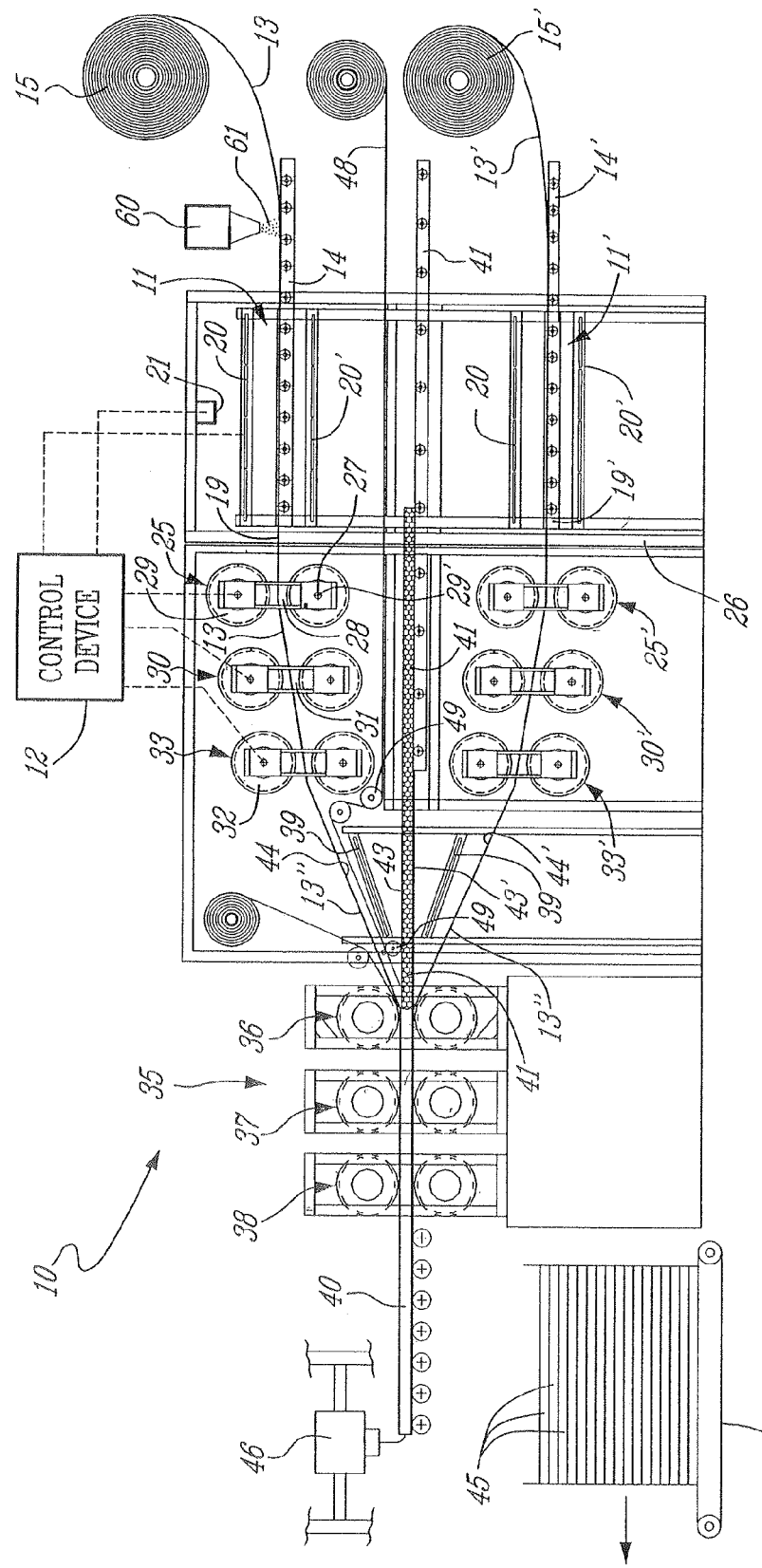
FIG. 1 is a simplified side view illustrating the machine and process of the present invention for the production of lightweight thermoplastic composite material and products in a continuous manner.

Referring now to the drawings and more particularly to FIG. 1, there is illustrated at 10 the machine of the present invention for the production of lightweight thermoplastic composite products in a continuous manner. The machine comprises at least one heating oven 11 and there is herein illustrated two such ovens 11 and 11' when fabricating a sandwich product 40 as illustrated in FIG. 3. A controller device 12 controls the temperature of the ovens 11 and 11'. Dry unconsolidated commingled fabrics 13 and 13' are fed to their respective ovens 11 and 11' by suitable feed means. As hereinshown, the commingled fabric sheets 13 and 13' are guided in their respective ovens 11 and 11' on roller conveyors 14 and 14', respectively. Such fabric 13 and 13' may be unwound from supply rolls 15 and 15', respectively. It may also be provided in very long sheet form.

Figure 2:
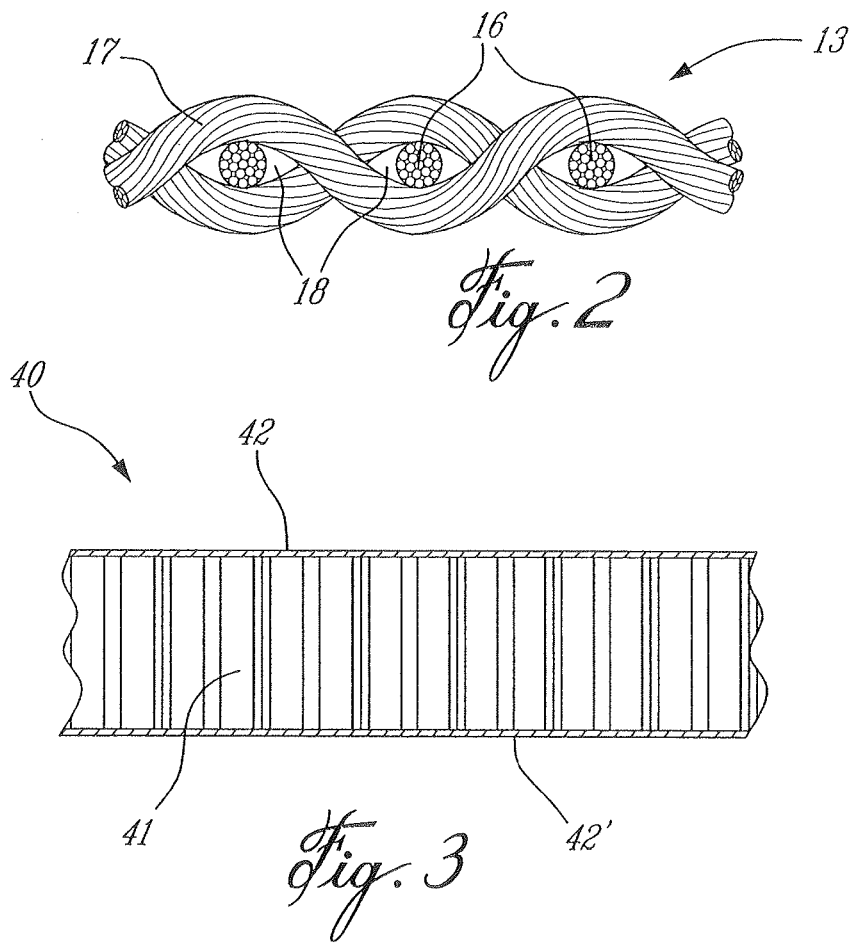
FIG. 2 is a cross-section view illustrating the unconsolidated composite fabric sheet comprised of commingled fibers.

As shown in FIG. 2, the fabric sheets 13 and 13' are comprised of dry unconsolidated commingled fibers of thermoplastic resin 16 and reinforcing fibers 17 of fiberglass material or carbon material. The fabric sheets 13 and 13' are conveyed through the oven and through the system by drive rollers as will be described later and controlled by the controller device 12. The controller device 12 also controls the temperature of the ovens 11 and 11' whereby to heat the fabrics to a temperature sufficient to ensure melting of the thermoplastic resin for it to start flowing between the fibers 17. The thermoplastic resin may be, for example, polypropylene, PET or polyamide fibers and they can be of different types or thicknesses. For polypropylene, the exit temperature from the oven would be higher than the melting point of this resin and therefore above 168° C. and preferably about 178° C. This ensures that the polypropylene has melted and starts flowing in the voids between the reinforcing fibers 16 and 17, as illustrated in FIG. 2. Accordingly, the fabric sheets 13 and 13' exit their ovens at the outlet 19 and 19' thereof with the thermoplastic resin in molten form. The temperature of the ovens is maintained substantially constant by controlling two parallel blocks 20 and 20' of infrared elements. Temperature sensors such as schematically illustrated at 21 provide signals to the controller device 12 to monitor the temperature of each oven and to control the infrared heaters. The controller 12 also controls the feed speed of the fabric sheet 13 being conveyed through the oven.

The machine 10 as herein illustrated was constructed to fabricate sandwich panels such as illustrated in FIG. 3 which is composed of a non-structural core 41 to which is fused two outer composite consolidated sheets 42 and 42' having been processed in the machine 10. The core material 41 can be an aluminum or polypropylene prefabricated honeycomb core, as illustrated at 41, or a rigid foam sheet or any suitable material. The core material should be a lightweight material capable of supporting shear and compressive stresses and providing good adhesion to the composite consolidated sheets 13". Seeing that the continuous composite consolidated sheets 13" are formed by identical equipment on opposed sides of the core sheet 41, only one side of the apparatus and process will follow. As shown in FIG. 1, the core material 41 is fed directly between the ovens and 11 and 11' in a substantially horizontal plane and on opposed sides thereof the composite consolidated sheets 42 are formed.

As illustrated, the machine and process consist of several stages of fabrication which are completely independent but related in a progressive manner. The purpose of the machine and process is to heat and consolidate the commingled fibers in the fabric and then laminate it on opposed sides of the core material 41. This continuous process and apparatus can achieve high volume of production and quality composite parts. The process offers significant advantages over conventional processing technologies as above-described. Some advantages include a short fabrication cycle, an unlimited length for products and mixed-processing possibilities, such as the construction of sandwich products or shaped products (profiles) are important advantages of this technology.

At the outlet 19 of the ovens, the fabric sheet 13 exits with the resin in a molten state and this sheet is immediately fed between a first pair of heated rollers 25 which are mounted on a support frame 26 which is provided with adjustments 27 whereby to adjust the gap 28 and therefore pressure between the rollers. Accordingly, the fabric sheet 13 is placed under pressure in this gap to squeeze the resin in the voids between the fibers. The rollers 29 and 29' of the first pair of heated rollers 25 also has the temperature thereof controlled by the controller device 12 whereby to maintain the sheet at a desired temperature and under pressure whereby to ensure consolidation of the molten resin with the reinforcing fibers and to achieve a composite consolidated sheet of predetermined thickness. The temperature of the first pair of heated rollers 25 and 25' is controlled within the range of about 60 to 120° C. thereby controlling the cooling rate of the fabric sheet 13.

The fabric sheet 13 exiting the first pair of heated rollers 25 is then subjected to a second pair of heated rollers 30 which are also mounted on adjustments to control the size of its gap 31. The temperature of the second set of heated rollers 30 is also controlled by the controller device 12 and maintained at a temperature which is lower than the first set of rollers 25 and preferably about 25° C. lower. Accordingly, the temperature of the fabric sheet 13 is gradually decreased while maintained under pressure by these two pairs of rollers.

A still further pair of rollers 33 engages the fabric sheet 13 and its rollers 32 and 32' are also adjustable to maintain the fabric sheet 13 under pressure. This further set of rollers 33 are not heated and operate at ambient temperature. At this stage in the process the fabric sheet 13 has now consolidated and it is now fed to processing devices 35 to form desired products. It is pointed out that the fabric sheet 13 is conveyed through the apparatus by the pairs of rollers 25, 30 and 33 which are driven in synchronism. Such drives are well known in the art. Also, the pairs of rollers 36, 37 and 38 as illustrated in the processing device 35 may also be driven and also in synchronism. All of these rollers are controlled by the controller device 12.

As hereinshown the apparatus is structured to form sandwich panels the cross-section of which is illustrated at 40 in FIG. 3. In order to do so, there is further provided three pairs of rollers 36, 37 and 38 which maintain pressure on the sandwich which is formed thereunder to ensure that the composite consolidated sheet 13" fed on opposed sides of the core 41 are well bonded thereto. In order to achieve this bond, the outer faces 43 and 43' of the core sheet 41 are heated by infrared heaters 39 and 39'. These infrared heaters also provide radiant heat, in the order of about 160° C., to the inside surfaces or bonding surfaces 44 and 44' of the composite consolidated sheets 13", respectively. This melts the thermoplastic resin on the surfaces thereof which are to be bonded to the outer surfaces of the core sheet 41. The panels may have a thickness of from about 5 mm to about 50 mm. The sets of rolls 36, 37 and 38 are adjusted to maintain pressure on this sheet as it cools to rigidly bond to the core material thus producing at its outlet a continuous sheet which can then be cut into sheet sections 45 by a slitter device 46 which moves with the sandwich sheet 40 to cut the sheet transversely thereacross to form individual structural sheets or panels 45 which can then be stacked, as hereinshown on a conveyor means 47 and then automatically transported. The slitter 46 is also controlled by the controller device which can adjust the size of the sheets down to narrow panels.

If the core material 41 is constructed of light aluminum or light wood product, then in order to fuse the composite consolidated sheets 13" thereto, there may be interposed between the consolidated sheets and the outer surfaces of the core sheet 41 a binder sheet 48 guided over the infrared heaters 39 by guide rolls 49 to adhere the composite consolidated sheets 13' to opposed surfaces of the core material. If it is desirable to embed a color effect on the opposed faces of the sandwich product 40, then a plastic colored film sheet 50 may be fed over the top surface of the upper composite consolidated sheet 13" as herein illustrated. This sheet would adhere to the top face of the thermoplastic material which is heated and bind thereto by the hot thermoplastic material.

Figure 4:
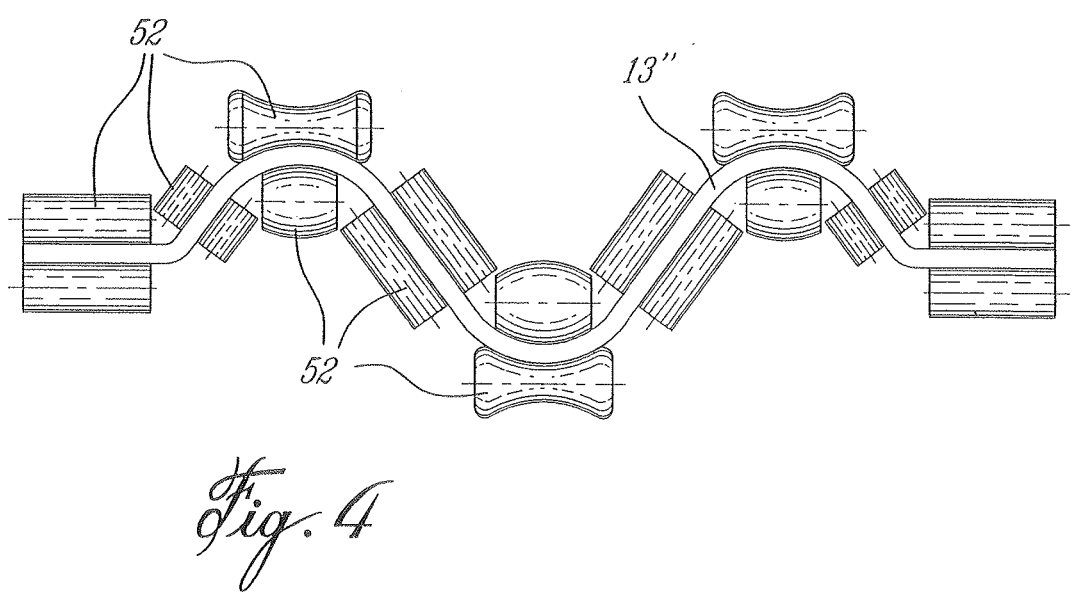
FIG. 4 illustrates the construction of a guardrail profile formed at the outlet end of the machine by forming rollers.

It is pointed out that although the machine as herein illustrated is to construct the sandwich panel product 40 as illustrated in FIG. 3, the machine can operate with simply the upper part thereof with a single oven and sets of rolls 25, 30 and 33 whereby to produce a single composite consolidated sheet 13" which is then processed by the processing device 35 which may consist of sets of forming rolls 52 as illustrated in FIG. 4 whereby to shape the continuous composite consolidated sheet 13" as illustrated in FIG. 4 to form a desired profile. As hereinshown the profile being formed is that for use in the construction of guardrails and many of these wave shapes can be formed across the sheet and then cut into long strip sections of shaped products. These forming rolls 52 would progressively shape the sheet which is still hot and malleable prior to complete cooling thereof. These shaped sheets could also be cut by the device 46. The cutter device 46 can have various forms and could be a laser cutting machine or other suitable cutter devices.

As above pointed out, the conveying means consist of the pairs of rollers 25, 30, 33 and also rollers 36, 37, 38 if provided. These rolls are connected to variable speed drive motors, not shown, but obvious to a person skilled in the art and which are automatically controlled by the controller device whereby to adjust the feed speed of the fabric sheet to ensure full consolidation. Also, the adjustment of the gaps between these rollers can be adjusted mechanically or automatically.

Summarizing now the continuous process for the production of lightweight thermoplastic composite products, it comprises the steps of feeding on a continuous basis the sheet 13 of the dry unconsolidated commingled fibers of thermoplastic resin and reinforcing fiberglass or carbon fibers through various controlled process stages. The first stage comprises an oven 11 to heat the sheet to a temperature sufficient to ensure the melting of the thermoplastic resin fibers. The sheet 13 is then subjected to further controlled heat and pressure treatment by a first pair of heated rollers 25 which have the gap thereof adjusted depending on the thickness of fabric sheet 13 fed to rollers to squeeze the resin within the voids between the reinforcing fibers. The speed is also controlled in accordance with the characteristics of that sheet. The rollers 25 are heated to a predetermined temperature, whereby the temperature of the heated sheet can be controlled and compressed between the rolls to ensure full consolidation of the resin with the structural fibers. The sheet is also fed through a second set of heated rollers which maintain the sheet at a reduced temperature and continuously under pressure to assure that the resin flows into the interstices of the fibers in the fabric sheet and full consolidation. The last set of rollers 33 operate at ambient temperature and at that stage the fabric sheet 13 has almost fully consolidated and it is now ready to be treated in the processing device to fabricate desired products as above-described. As shown in FIG. 1, it is also envisaged that a color may be imparted to at least one face of the composite consolidated sheet. As hereinshown, a hopper 60 is provided at the inlet of the top oven 20 whereby to deposit on the unconsolidated fabric sheet 13 a colored plastic powder material 61 which will melt in the oven and flow in the sheet to provide a color effect at the surface of the top consolidated sheet 13". However, this hopper 60 may be installed after the oven or at any other stages between the consolidation rollers depending on the type of powder and application.

It is also within the ambit of the present invention to cover any other obvious modifications provided such modifications fall within the scope of the appended claims.

I claim:

1. A continuous process for the production of lightweight thermoplastic composite products, said process comprising the steps of:
   i) feeding on a continuous basis a fabric sheet of dry unconsolidated commingled fibers of thermoplastic resin and reinforcing fiberglass or carbon fibers in an oven to heat said sheet to a temperature sufficient to insure melting and flow of said thermoplastic resin fibers,
   ii) subjecting said fabric sheet to further controlled heat and pressure by feeding same from said oven and through a gap between a first pair of heated rollers, said rollers being heated to a predetermined temperature to avoid abrupt cooling at surfaces of said fabric sheet and compressing said sheet in said gap,
   iii) feeding said fabric sheet through further pairs of rollers, at least one pair of which is a pair of heated rollers operating at reduced temperature from said first pair of heated rollers to reduce the temperature of said sheet and further maintain said sheet under pressure to insure full distribution of the resin in voids of said commingled fibers and to obtain a desired sheet thickness while causing said commingled fibers to consolidate to thereby form a continuous composite consolidated sheet, iv) controlling the temperature of said oven and said heated rollers, and controlling a feed speed of said sheet through said oven and rollers, and v) processing said sheet to form a desired product.

2. A continuous process for the production of lightweight thermoplastic composite products as claimed in claim 1 wherein said thermoplastic fibers are polypropylene fibers, said step (i) comprising heating said sheet to a temperature of at least 168° C. which is the melting point of said polypropylene fibers.

3. A continuous process for the production of lightweight thermoplastic composite products as claimed in claim 1 wherein said gap of said first pair of rollers is an adjustable gap and said process comprises adjusting the size of said gap to exert a predetermined pressure on said sheet to exert a predetermined pressure to compress said sheet to obtain consolidation and a desired sheet thickness.

4. A continuous process for the production of lightweight thermoplastic composite products as claimed in claim 3 wherein said at least one pair of heated rollers of said further pair of rollers is further provided with an adjustable gap, said process comprising adjusting the temperature of said further pair of rollers below the temperature of said first pair of rollers to progressively lower the temperature of said sheet and further compress same.

5. A continuous process for the production of lightweight thermoplastic composite products as claimed in claim 4 wherein there is further provided the step of further compressing said sheet through a third pair of rollers operating at ambient temperature.

6. A continuous process for the production of lightweight thermoplastic composite products as claimed in claim 1 wherein after said step (v) there is comprised the step of conveying said sheet to a cutting mechanism to slit said sheet to form composite sheet products.

7. A continuous process for the production of lightweight thermoplastic composite products as claimed in claim 1 wherein said step (v) comprises progressively shaping said sheet through pairs of forming rolls to impart a desired profile to said sheet while said sheet is at a formable temperature whereby to form profiled products.

8. A continuous process for the production of lightweight thermoplastic composite products as claimed in claim 1 wherein said step (v) comprises feeding said consolidated sheet through one or more pairs of pressure rolls having an adjustable gap therebetween and through which there is conveyed a backing sheet material to thereby adhere a surface of said consolidated sheet by molten thermoplastic to said backing sheet by pressure imparted by said pressure rolls.

9. A continuous process for the production of lightweight thermoplastic composite products as claimed in claim 8 wherein there is further provided the step of re-heating said surface of said consolidated sheet and a facing surface of said backing sheet material prior to feeding same through said pressure rolls.

10. A continuous process for the production of lightweight thermoplastic composite products as claimed in claim 8 wherein there is further provided the step of feeding a binder sheet between said backing sheet and said consolidated sheet as they are fed through said pressure rolls to bond them together under pressure from said pressure rolls.

11. A continuous process for the production of lightweight thermoplastic composite products as claimed in claim 9 wherein there is further provided the step of feeding a plastic colored film sheet on top and/or bottom surfaces of said consolidated sheet as they are fed through said pressure rolls to embed a color effect to said top sheet.

12. A continuous process for the production of lightweight thermoplastic composite products as claimed in claim 2 wherein said desired product is a sandwich panel product by the further steps of (a) forming two consolidated sheets simultaneously by subjecting a further sheet of dry unconsolidated commingled fibers through a further oven and heated rolls and repeating steps (i) to (iii); (b) feeding said two consolidated sheets one above the other in spaced relationship; (c) feeding a core sheet material at ambient temperature between said two consolidated sheets in co-planar relationship; (d) pre-heating at least opposed faces of said core sheet material; and (e) feeding said opposed consolidated sheet in contact with a respective one of said opposed faces through at least one pair of pressure rolls to bond them to said opposed faces of said core.

13. A continuous process for the production of lightweight thermoplastic composite products as claimed in claim 12 wherein said step (d) also comprises simultaneously pre-heating inner faces of said two opposed consolidated sheets to melt thermoplastic on said inner faces to enhance bonding on said opposed faces of said core material.

14. A continuous process for the production of lightweight thermoplastic composite products as claimed in claim 1 wherein prior to said step (i) there is provided the step depositing on a top surface of said sheet of dry unconsolidated commingled fibers colored plastic powder material to impart a color effect to said surface.

\* \* \* \* \*